United States Patent [19]
Fujita et al.

[11] Patent Number: 5,636,709
[45] Date of Patent: Jun. 10, 1997

[54] LUBRICANT-CONTAINING END CAP FOR A BICYCLE CONTROL CABLE

[75] Inventors: Kouji Fujita; Satoru Koga, both of Sakai, Japan

[73] Assignee: Shimano, Inc., Osaka, Japan

[21] Appl. No.: 669,947

[22] Filed: Jun. 25, 1996

[51] Int. Cl.$^6$ ...................................... F16N 7/12
[52] U.S. Cl. ................... 184/16; 184/15.1; 74/502.4; 74/502.6
[58] Field of Search ............... 74/502.4, 502.6; 384/13; 184/15.1, 15.2, 15.3, 16

[56] References Cited

U.S. PATENT DOCUMENTS

| 4,066,147 | 1/1978 | Toyomoto | 184/15.1 |
| 4,892,005 | 1/1990 | Nagiano | 184/15.1 |
| 5,443,139 | 8/1995 | Scott | 184/15.2 |

FOREIGN PATENT DOCUMENTS

| 964748 | 8/1950 | France | 74/502.6 |
| 5-50978 | 3/1993 | Japan . | |

Primary Examiner—Thomas E. Denion
Attorney, Agent, or Firm—James A. Deland

[57] ABSTRACT

An end cap for a bicycle cable of the type wherein an inner cable slides within an outer casing includes a housing defining a hollow lubricant-filled chamber. The housing has a first end defining an opening for receiving the inner cable therethrough and a second end adapted to fit to the outer casing of the bicycle control cable. A first screen screens the opening at the first end of the housing, wherein the first screen is structured to rupture when the inner cable is passed therethrough. A displaceable second screen screens the second end of the housing. A seal is disposed at the first end of the housing. The seal includes an annular seal member defining an inner area, and the seal member is sized to sealingly fit over the outer periphery of the inner cable of the bicycle control cable.

32 Claims, 4 Drawing Sheets

LUBRICANT-CONTAINING END CAP FOR A BICYCLE CONTROL CABLE

BACKGROUND OF THE INVENTION

The present invention is directed to end caps for bicycle control cables and, more specifically, to an end cap which can be used to lubricate exposed ends of the control cable.

Bicycle control cables ordinarily comprise an inner cable which slides back and forth within an outer casing. The inner cable is sometimes lubricated to reduce friction between the inner cable and outer casing for smooth operation, and the control cable often contains end caps which seal the locations where the inner cable emerges from the outer casing to prevent contaminants from entering the space between the inner cable and outer casing.

Control cables are usually sold by the component maker precut to size with the end caps installed at the factory. However, different lengths of control cable are often used for different bicycles, and it is not feasible for bicycle repair shops to stock all the different sizes of factory replacement control cables. Also, bicycle manufacturers must meet strict production deadlines, and if the component maker can not supply the proper length cable in time, then the manufacturer would be unable to produce the completed bicycles. Consequently, both bicycle makers and bicycle shops often buy the inner cable and outer casing in bulk and cut the inner cable and outer casing stock to fabricate replacement control cables themselves. While this procedure helps the bicycle manufacture avoid production delays and helps the bicycle shop avoid stocking excessive inventory, the replacement cables can be difficult to fabricate because it is difficult to effectively lubricate the resulting control cable. For example, there often is a very small gap between the inner cable and outer casing, thus making it difficult to properly instill the lubricant. The lubricant often clings to the outside of the outer casing and must be wiped off. If the lubricant is added to the end cap before the end cap is placed on the cable, then the lubricant often leaks from the opening in the end cap before and during installation, thus creating a big mess. Clearly, a method and apparatus for easily lubricating such control cables is much desired.

SUMMARY OF THE INVENTION

The present invention is directed to a lubricant-containing end cap for bicycle control cables and a method of installing it which allows the bicycle mechanic to lubricate the control cable assembly during fabrication without difficulty. Furthermore, since the lubricant is already contained in the end cap, the bicycle mechanic need not separately add lubricant, so the procedure is very clean.

In one embodiment of the present invention, an end cap for a bicycle cable of the type wherein an inner cable slides within an outer casing includes a housing defining a hollow lubricant-containing chamber. The housing has a first end defining an opening for receiving the inner cable therethrough and a second end adapted to fit to the outer casing of the bicycle control cable. A first screen screens the opening at the first end of the housing, wherein the first screen is structured to rupture when, for example, the inner cable is passed therethrough. A second screen screens the second end of the housing. The first and second screens are structured to substantially prevent the lubricant from escaping from the chamber. A seal may be disposed at the first end of the housing. The seal includes an annular seal member defining an inner area, and the seal member is sized to sealingly fit over the outer periphery of the inner cable of the bicycle control cable.

To use the end cap according to the present invention, the second screen is displaced from the second end of the housing either by lifting off the second screen or by rupturing it. The outer casing is then fitted to the second end of the housing. Since the first screen substantially prevents the lubricant from escaping from the first end of the housing, the lubricant is forced into the outer casing as the end cap is fitted to the housing. Thereafter, the first screen is ruptured and the inner cable is inserted through the seal member and into the outer casing from the first end of the housing. To facilitate assembly, the first screen can be ruptured with the inner cable as the inner cable is inserted into the housing, thus eliminating the requirement of using a separate tool. The annular seal member then seals the lubricated control cable from contamination.

DETAILED DESCRIPTION OF THE EMBODIMENTS

Figure 1:
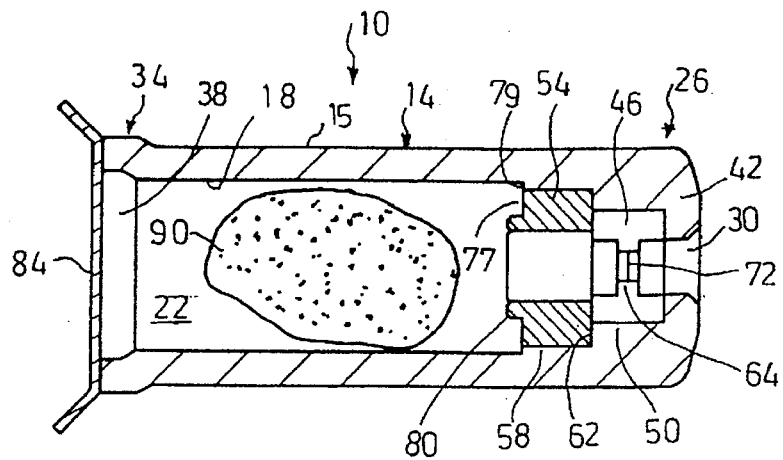
FIG. 1 is a cross sectional view of a particular embodiment of a lubricant containing end cap according to the present invention for a bicycle control cable.

FIG. 1 is a cross sectional view of a particular embodiment of a lubricant-containing end cap 10 according to the present invention. End cap 10 is used with a bicycle control cable 11 (FIG. 7) of the type wherein an inner wire 12 slides within an outer casing 13. Outer casing 13 typically comprises a wound wire (indicated conceptually by the diagonal lines within outer casing 13) covered with a plastic material. Some types of outer casing 13 include a liner disposed between the wound wire and inner cable 12 to reduce friction between outer casing 13 and inner wire 12.

In this embodiment, end cap 10 comprises a housing 14 (FIG. 1) including a generally tubular side wall 15 having an inner peripheral surface 18 defining a hollow chamber 22. A first end 26 of housing 14 defines an opening 30 for receiving inner cable 12 therethrough, and a second end 34 of housing 14 is structured to fit to the outer casing 13 of control cable 11. For example, inner peripheral surface 18 may be sized to fit over the outer peripheral surface of outer casing 13 of cable 11 so that outer casing 13 may be inserted into chamber 22.

First end 26 of housing 14 includes a radially inwardly extending shoulder 42 which defines opening 30. In this embodiment, shoulder 42 is formed as one piece with side wall 15, but shoulder 42 may be formed separately and bonded to side wall 15 if desired. In other embodiments, shoulder 46 may be omitted altogether. A seal 46 is fitted within a reduced diameter portion 50 of side wall 15 and abuts against shoulder 42, and a base plate 54 is fitted within a reduced diameter portion 58 of side wall 15 and abuts against a shoulder 62 formed between reduced diameter portion 50 and reduced diameter portion 58. Seal 46 is generally cylindrically shaped and includes an annular seal member 64 which may be toroidally shaped. Seal member 64 helps to seal inner cable 12 while allowing inner cable 12 to exit the end cap at an angle without adding excessive friction. Seal member 64 defines an inner area or opening 68 which, in this embodiment, is screened by a screen 72 which is structured to rupture when inner cable 12 is passed through it. For example, screen 72 may be formed very thin (e.g., 0.1 mm. to 0.3 mm.), or it may be formed from a material which ruptures easily. Seal 46 may be formed of a thermoplastic material, and screen 72 may be formed simultaneously with seal 46 by injection molding.

Base plate 54 is generally cylindrically shaped and forms an opening 76 for receiving inner cable 12 therethrough. Base plate 54 may be formed from a glass fiber reinforced thermoplastic, and it may include an annular extension sized to fit within outer casing 13 of control cable 11, but such is not necessary. In this embodiment, a side surface 77 of base plate 54 and a shoulder 79 formed by reduced portion 58 of side wall 15 together form an abutment for an end of outer casing 13 when outer casing 13 is fully inserted into housing 14. Base plate 54 and shoulder 79 function to receive the compressive force, if any, from outer casing 13 (or any outer casing wires or outer casing liner) so that outer casing 13 does not compress seal 46 which could add unnecessary resistance to the sliding of inner cable 12.

Figure 12:
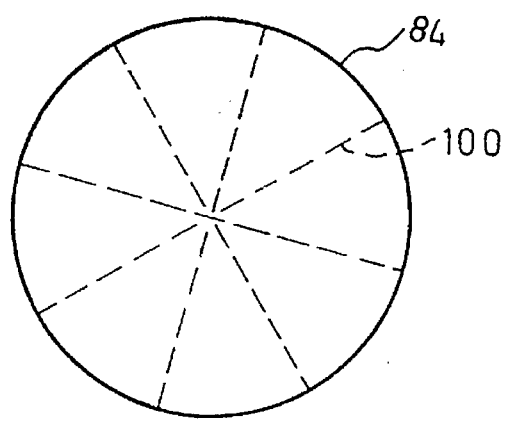
FIG. 12 is a view of a screen disposed at the end of the housing including perforations or recessed lines to facilitate rupturing.

A screen 84 is attached to housing 14 for screening the second end 34 of housing 14. Screen 84 may be bonded to side wall 15 by an appropriate adhesive, by welding, or by some other method. Screen 84 may be formed from an olefine, polypropylene, polyethylene, polystyrene, foil, or some other material capable of being removed by lifting off (as in FIG. 2) or by rupturing (as in FIG. 3). Screen 84 may be formed very thin (e.g., approximately 0.1 mm.) and may include perforations or recessed lines 100 to facilitate rupturing as shown in FIG. 12. Such perforations or lines also may be provided in screen 72. Finally, a lubricant 90 is disposed within chamber 22. Lubricant 90 may be a multipurpose grease or some other lubricant as the application requires. If desired, part or all of housing 14 may be formed from a transparent material, thus allowing the user to determine the kind and/or mount of lubricant 90 disposed within chamber 22.

Figure 2:
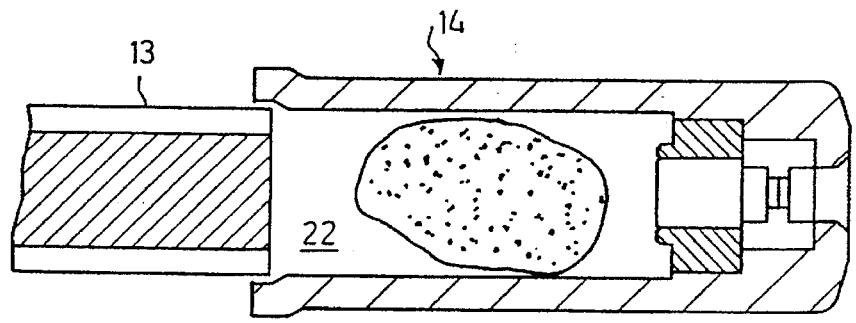
FIG. 2 is a cross sectional view of the end cap with the left side screen removed.
Figure 3:
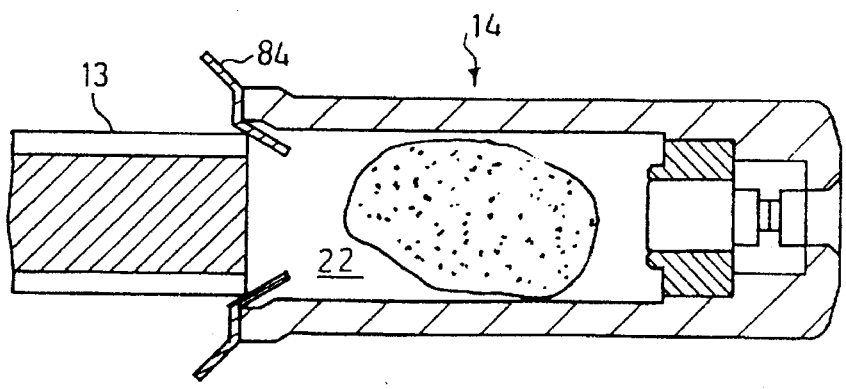
FIG. 3 is a cross sectional view of the end cap showing displacement of the left side screen by rupturing the screen with the outer casing of the bicycle control cable.
Figure 4:
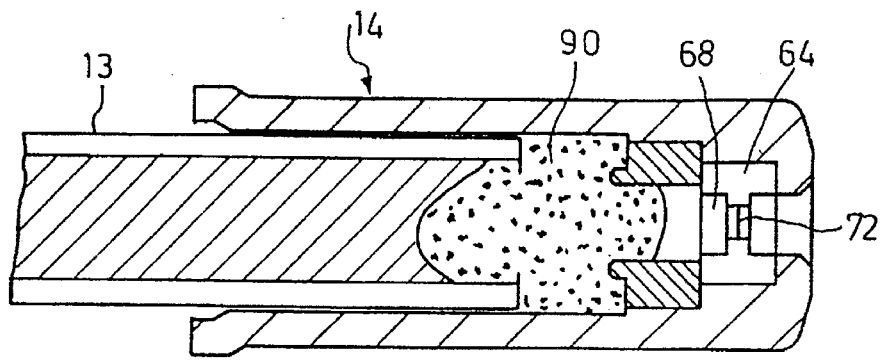
FIG. 4 is a cross sectional view of the end cap being fitted to the outer casing of the bicycle control cable.
Figure 5:
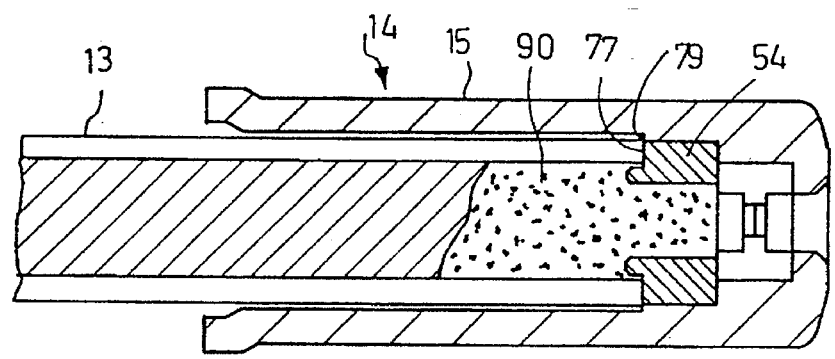
FIG. 5 is a cross sectional view of the end cap fully fitted to the outer casing of the bicycle control cable.

FIGS. 2-7 illustrate the method according to the present invention for using the end cap 10. First, screen 84 is removed and outer casing 13 is inserted into housing 14 as shown in FIG. 2. Alternatively, screen 84 may be ruptured by outer casing 13 as outer casing is inserted into housing 14 as shown in FIG. 3. Thereafter, outer casing 13 is inserted further into housing 14. When outer casing 13 is pushed into lubricant 90, lubricant 90 is forced to flow into outer casing 13 as shown in FIG. 4 since screen 72 substantially prevents the lubricant from escaping from the first end of the housing. As shown in FIG. 5, outer casing 13 is inserted all the way into housing 14 until the end of outer casing 13 abuts against the abutment formed by side surface 77 of base plate 54 and the shoulder 79 formed by reduced portion 58 of side wall 15. Depending on the type of lubricant used, lubricant 90 may continue to migrate through the interior of outer casing 13 over time.

Figure 6:
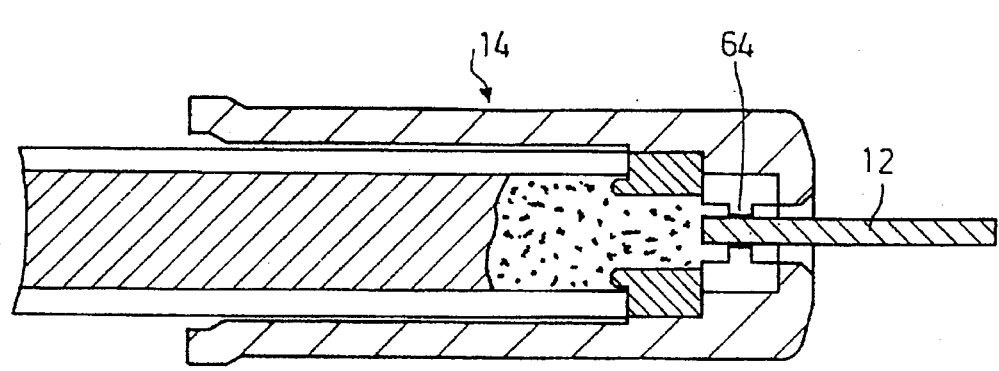
FIG. 6 is a cross sectional view of the end cap as the inner cable is inserted through the right side of the end cap.
Figure 7:
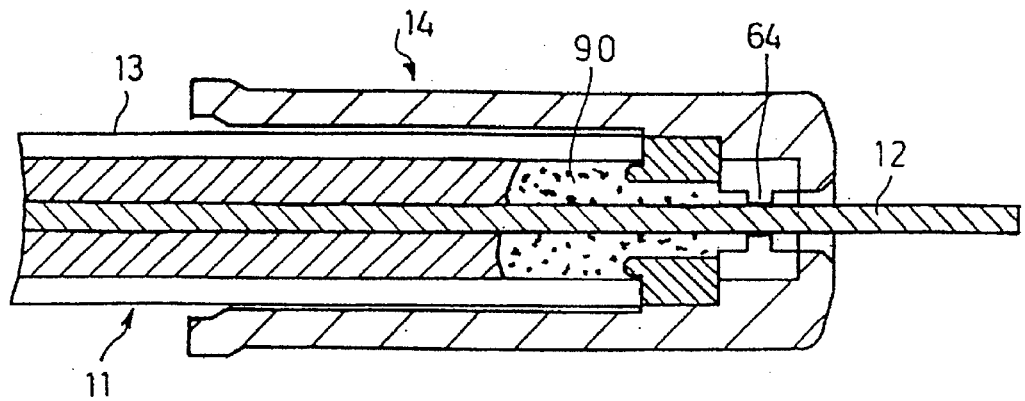
FIG. 7 is a cross sectional view of the end cap with the inner cable fully inserted.

After outer casing 13 is fully seated within housing 14, screen 72 is ruptured and inner cable 12 is inserted through seal member 64 as shown in FIG. 6. In this embodiment, screen 72 is preferably ruptured by inner cable 12 as inner cable 12 is inserted through seal member 64 rather than by using a separate tool. Thereafter, inner cable 12 is inserted completely through housing 14 and outer casing 13 as shown in FIG. 7. As inner cable 12 passes through lubricant 90, some of the lubricant adheres to inner cable 12 so that much or all the length of inner cable 12 is lubricated. Seal member 64 is sized to sealingly fit over the outer peripheral surface of inner cable 12, so lubricant 90 is retained within housing 14. As a result, the control cable may be lubricated easily without the mess encountered with prior art methods.

For control cables with two such end caps, the second end cap may be installed after installing the first end cap by removing second cover 84 from the second end cap (or rupturing the second cover 84 with the inner cable 12 and/or outer casing 13), inserting inner cable 12 through first cover 72, and then inserting outer casing 13 into the end cap (possibly completing the rupturing of second cover 84, if not removed previously).

Figure 8:
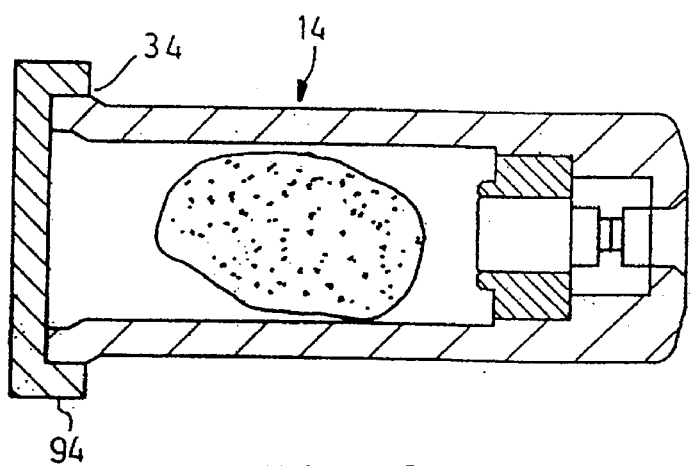
FIG. 8 is a cross sectional view of an alternative embodiment of an end cap according to the present invention.
Figure 9:
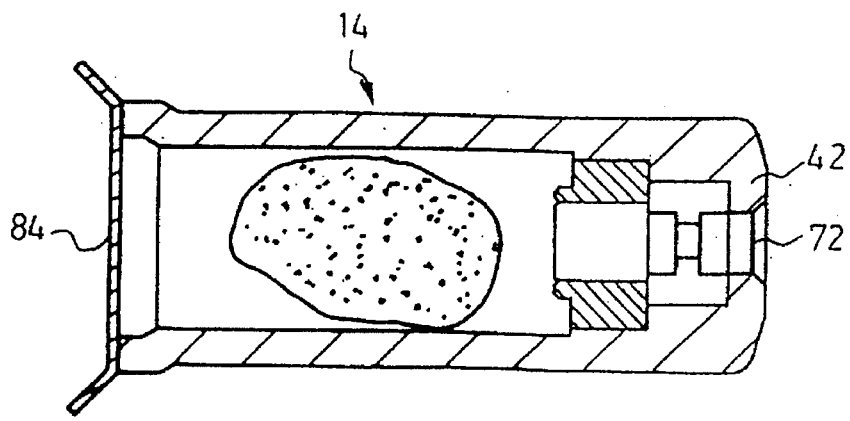
FIG. 9 is a cross sectional view of another alternative embodiment of an end cap according to the present invention.
Figure 10:
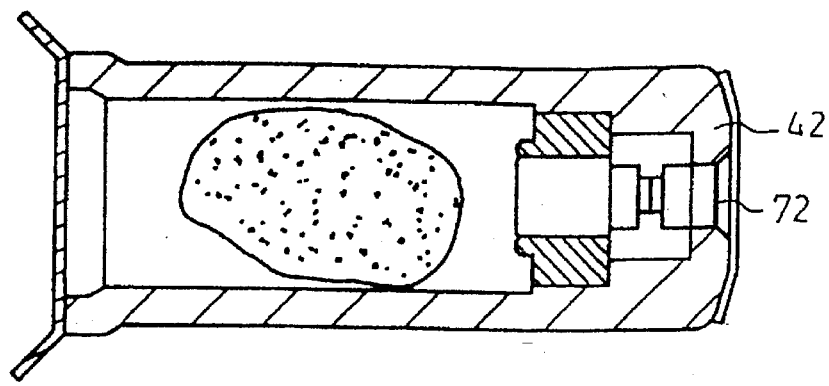
FIG. 10 is a cross sectional view of another alternative embodiment of an end cap according to the present invention.
Figure 11:
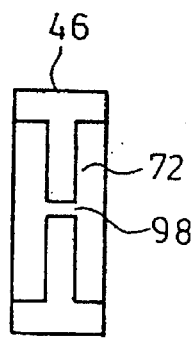
FIG. 11 is a cross sectional view of an alternative embodiment of the annular seal shown in FIG. 1.

While the above is a description of various embodiments of the present invention, further modifications may be employed without departing from the spirit and scope of the present invention. For example, as shown in FIG. 8, screen 84 may include a side surface 94 that is sized to fit over the outer peripheral surface of side wall 15. As shown in FIG. 9, screen 72 may be disposed within opening 30 defined by shoulder 42, or else screen 72 may be disposed on an external surface of shoulder 42 as shown in FIG. 10. The structure of the control cable is not critical as long as it is capable of fitting to the housing. Although screens 72 and 84 were shown as solid panels devoid of openings, that is not necessary as long as they are capable of substantially preventing lubricant 90 from escaping from chamber 22. For example, FIG. 11 shows an embodiment of seal 46 wherein an opening 98 is formed in screen 72. Multiple such openings may be formed in screen 72, and the same may be formed in screen 84.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a first screen (72) screening the opening (30) at the first end (26) of the housing (14), the first screen (72) being structured to rupture when the inner cable [(72)](12) is passed therethrough; and a second screen (84) disposed at an extreme free edge of the second end of the housing for screening the second end (34) of the housing (14).

2. The end cap according to claim 1 further comprising a seal (46) disposed at the first end (26) of the housing (14), the seal (46) including an annular seal member (64) defining an inner area (68), the seal member (64) being sized to sealingly fit over the outer periphery of the inner cable (12) of the bicycle control cable (12).

3. The end cap according to claim 2 wherein the first screen (72) is disposed in the annular seal member (64) for screening the inner area (68).

4. The end cap according to claim 1 wherein the housing (14) further comprises a radially inwardly extending shoulder (42) at the first end (26) of the housing (14), the shoulder (42) defining the opening (30) for receiving the inner cable (12) therethrough.

5. The end cap according to claim 1 wherein the second screen (84) is detachably attached to the second end (34) of the housing (14).

6. The end cap according to claim 1 wherein the housing (14) is formed from a transparent material.

7. The end cap according to claim 1 wherein the first screen (72) includes an opening (98).

8. The end cap according to claim 1 wherein the first screen (72) is devoid of openings therein.

9. An end cap for a bicycle control cable (11) of the type wherein an inner cable (12) slides within an outer casing (13) Comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a first screen (72) screening the opening (30) at the first end (26) of the housing (14), the first screen (72) being structured to rupture when the inner cable (72) is passed therethrough;

a second screen (84) screening the second end (34) of the housing (14);

wherein the housing (14) further comprises a radially inwardly extending shoulder (42) at the first end (26) of the housing (14), the shoulder (42) defining the opening (30) for receiving the inner cable (12) therethrough; and wherein the first screen (72) is disposed on an external surface of the shoulder (42) for screening the opening (30).

10. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a first screen (72) screening the opening (30) at the first end (26) of the housing (14), the first screen (72) being structured to rupture when the inner cable (12) is passed therethrough;

a second screen (84) screening the second end (34) of the housing (14):

wherein the housing (14) further comprises a radially inwardly extending shoulder (42) at the first end (26) of the housing (14), the shoulder (42) defining the opening (30) for receiving the inner cable (12) therethrough; and wherein the first screen (72) is disposed in the opening (30) defined by the radially inwardly extending shoulder (42) for screening the opening (30).

11. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a first screen (72) screening the opening (30) at the first end (26) of the housing (14), the first screen (72) being structured to rupture when the inner cable (12) is passed therethrough;

a second screen (84) screening the second end (34) of the housing (14); and wherein the second screen (84) is structured to rupture when the outer casing (13) is passed therethrough.

12. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a seal (46) disposed at the first end (26) of the housing (14), the seal (46) including:

an annular seal member (64) defining an inner area (68), the seal member (64) being sized to sealingly fit over the outer periphery of the inner cable (12) of the bicycle control cable (11); and a first screen (72) disposed at the inner area (68) for screening the inner area (68), the first screen (72) being structured to rupture when the inner cable (12) is passed therethrough; and a second screen (84) disposed at an extreme free edge of the second end of the housing for screening the second end (34) of the housing (14).

13. The end cap according to claim 12 wherein the housing (14) is formed from a transparent material.

14. The end cap according to claim 12 wherein the first screen (72) includes an opening (98).

15. The end cap according to claim 12 wherein the first screen (72) is devoid of openings therein.

16. The end cap according to claim 12 wherein the second screen (84) is detachably attached to the second end (34) of the housing (14).

17. The end cap according to claim 12 wherein the annular seal member (64) is toroidally shaped.

18. The end cap according to claim 12 wherein the housing (14) includes a tubular side wall (15) having an inner peripheral surface (18) sized to fit over an outer peripheral surface of the outer casing (13) of the control cable (11).

19. The end cap according to claim 20 wherein the housing (14) further comprises a radially inwardly extending first shoulder (42) at the first end (26) of the housing (14), the first shoulder (42) defining the opening (30) for receiving the inner cable (12) therethrough.

20. The end cap according to claim 19 wherein the first shoulder (42) is formed as one piece with the side wall (15).

21. The end cap according to claim 19 wherein the seal (46) is disposed within the housing (14) in close proximity to the first shoulder (42).

22. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

lubricant (90) disposed in the chamber (22);

a seal (46) disposed at the first end (26) of the housing (14), the seal (46) including:

an annular seal member (64) defining an inner area (68), the seal member (64) being sized to sealingly fit over the outer periphery of the inner cable (12) of the bicycle control cable (11); and a first screen (72) disposed at the inner area (68) for screening the inner area (68), the first screen (72) being structured to rupture when the inner cable (12) is passed therethrough;

a second screen (84) screening the second end (34) of the housing (14); and wherein the second screen (84) includes a side surface (94) adapted to fit over an outer peripheral surface of the second end (34) of the housing (14).

23. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22);

a seal (46) disposed at the first end (26) of the housing (14), the seal (46) including:

an annular seal member (64) defining an inner area (68), the seal member (64) being sized to sealingly fit over the outer periphery of the inner cable (12) of the bicycle control cable (11): and a first screen (72) disposed at the inner area (68) for screening the inner area (68), the first screen (72) being structured to rupture when the inner cable (12) is passed therethrough;

a second screen (84) screening the second end (34) of the housing (14);

wherein the second screen (84) is structured to rupture when the outer casing (13) is passed therethrough.

24. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

wherein the housing (14) includes a tubular side wall (15) having an inner peripheral surface (18) sized to fit over an outer peripheral surface of the outer casing (13) of the control cable (11);

wherein the housing (14) further comprises a radially inwardly extending first shoulder (42) at the first end (26) of the housing (14), the first shoulder (42) defining the opening (30) for receiving the inner cable (12) therethrough;

wherein the inner peripheral surface (18) of the housing (14) defines a second shoulder (79) sized to abut against the outer casing (13) of the bicycle control cable (11) when the outer casing (13) is fitted to the housing (14).

a lubricant (90) disposed in the chamber (22);

a seal (46) disposed within the first end (26) of the housing (14) in close proximity to the first shoulder (42), the seal (46) including:

an annular seal member (64) defining an inner area (68), the seal member (64) being sized to sealingly fit over the outer periphery of the inner cable (12) of the bicycle control cable (11);

a first screen (72) disposed at the inner area (68) for screening the inner area. (68), the first screen (72) being structured to rupture when the inner cable (12) is passed therethrough: and a second screen (84) screening the second end (34) of the housing (14).

25. An end cap for a bicycle control cable (11) of the type wherein an inner cable (12) slides within an outer casing (13) comprising:

a housing (14) defining a hollow chamber (22), the housing (14) having a first end (26) defining an opening (30) for receiving the inner cable (12) therethrough and a second end (34) adapted to fit to the outer casing (13) of the bicycle control cable (11);

wherein the housing (14) includes a tubular side wall (15) having an inner peripheral surface (18) sized to fit over an outer peripheral surface of the outer casing (13) of the control cable (11);

wherein the housing (14) further comprises a radially inwardly extending first shoulder (42) at the first end (26) of the housing (14), the first shoulder (42) defining the opening (30) for receiving the inner cable (12) therethrough;

wherein the inner peripheral surface (15) of the housing (14) defines a second shoulder (62);

a lubricant (90) disposed in the chamber (22);

a seal (46) disposed at the first end (26) of the housing (14), the seal (46) including:

an annular seal member (64) defining an inner area (68), the seal member (64) being sized to sealingly fit over the outer periphery of the inner cable (12) of the bicycle control cable (11); and a first screen (72) disposed at the inner area (68) for screening the inner area (68), the first screen (72) being structured to rupture when the inner cable (12) is passed therethrough;

a second screen (84) screening the second end (34) of the housing (14);

an annular base plate (54) disposed within the housing (14) and abutting against the second shoulder (62), wherein the seal (46) is disposed between the first shoulder (42) and the base plate (54), and wherein the base plate (54) is sized for abutting against the outer casing (13) when the outer casing (13) is fitted to the housing (14).

26. A method of assembling an end cap (10) to a bicycle control cable (11), the control cable (11) being of the type wherein an inner cable (12) slides within an outer casing (13), the end cap (10) being of the type which includes a housing (14) defining a lubricated hollow chamber (22), the housing (14) having a first end (26) defining an opening (30) for receiving the inner cable (12) therethrough and a second end (34) adapted to fit over the outer casing (13) of the bicycle control cable (11), a seal (46) disposed at the first end (26) of the housing (14), wherein the seal (46) includes an annular seal member (64) defining an inner area (68), a first screen (72) for screening the opening (30), and a second screen (84) disposed at the second end (34) of the housing (14), the method comprising the steps of, in order:

displacing the second screen (84) from the second end (34) of the housing (14);

inserting the outer casing (13) into the second end (34) of the housing (14);

rupturing the first screen (72); and inserting the inner cable (12) through the seal member (46) and into the outer casing (13) from the first end (26) of the housing (14).

27. The method according to claim 26 wherein the rupturing step comprises the step of rapturing the first screen (72) with the inner cable (12).

28. The method according to claim 26 wherein the displacing step comprises the step of rupturing the second screen (84) with the outer casing (13).

29. An end cap for a bicycle control cable (11) of the type wherein an inner cable (12) slides within an outer casing (13) comprising:

a housing (14) having an inner peripheral surface sized to fit over the outer casing (13) and defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22) and contacting the inner peripheral surface of the housing (14); and a first screen (72) screening the opening (30) at the first end (26) of the housing (14), the first screen (72) being structured to rupture when the inner cable (72) is passed therethrough.

30. The end cap according to claim 29 further comprising a second screen (84) screening the second end (34) of the housing (14).

31. An end cap for a bicycle control cable (11) of the type wherein an inner cable (12) slides within an outer casing (13) comprising:

a housing (14) having an inner peripheral surface sized to fit over the outer casing (13) and defining a hollow chamber (22), the housing (14) having a first end (26) defining an opening (30) for receiving the inner cable (12) therethrough and a second end (34) adapted to fit to the outer casing (13) of the bicycle control cable (11);

a lubricant (90) disposed in the chamber (22) and contacting the inner peripheral surface of the housing (14);

a seal (46) disposed at the first end (26) of the housing (14), the seal (46) including:

an annular seal member (64) defining an inner area (68), the seal member (64) being sized to sealingly fit over the outer periphery of the inner cable (12) of the bicycle control cable (11); and a first screen (72) disposed at the inner area (68) for screening the inner area (68), the first screen (72) being structured to rupture when the inner cable (12) is passed therethrough.

32. The end cap according to claim 31 further comprising a second screen (84) screening the second end (34) of the housing (14).

\* \* \* \* \*